May 8, 1928.

J. T. KENNEDY 1,669,089

VEHICLE WHEEL

Filed July 13, 1926

INVENTOR.
JESSE T. KENNEDY
BY A. B. Bowman
ATTORNEY

Patented May 8, 1928.

1,669,089

UNITED STATES PATENT OFFICE.

JESSE TILLUS KENNEDY, OF SAN DIEGO, CALIFORNIA.

VEHICLE WHEEL.

Application filed July 13, 1926. Serial No. 122,088.

My invention relates to vehicle wheels having demountable rims.

The objects of my invention are: first, to provide a vehicle wheel whereby the tire rim may be easily and quickly removed, changed or put on the felly of the wheel without removing, misplacing or losing such parts as clamps, bolts, nuts and the like; second, to provide a vehicle wheel having a demountable rim which may be secured to the felly in only one position and securely locked relative thereto; third, to provide simple screw means for securing the demountable rim to the felly of the wheel, whereby the lug means on the rim are forced tightly into the recesses in the felly of the wheel; and fourth, to provide a vehicle wheel of this class which is particularly simple and economical of construction, durable, efficient, and which will not readily deteriorate or get out of order.

Figure 1:
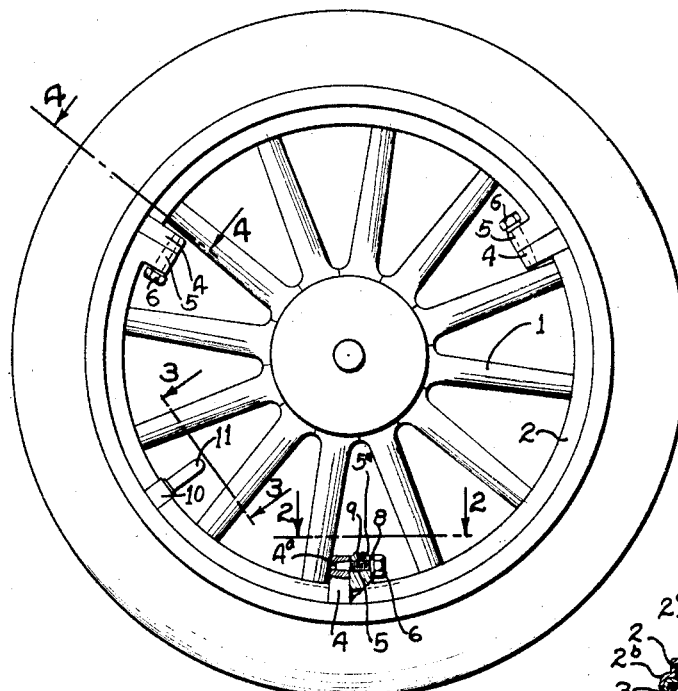
Figure 4:
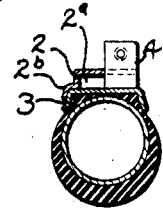
Figure 2:
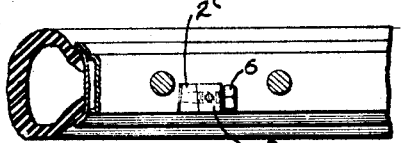
Figure 5:
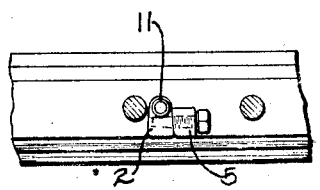
Figure 3:
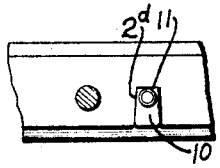

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my vehicle wheel in one form of construction, showing certain parts and portions thereof broken away and in section to facilitate the illustration; Fig. 2 is a fragmentary sectional view thereof, taken through 2—2 of Fig. 1, showing particularly the means of securing the rim to the felly of the wheel; Fig. 3 is a fragmentary sectional view thereof, taken through 3—3 of Fig. 1, showing the means and method of extending the valve stem of the pneumatic tube of the tire through the felly of the wheel; Fig. 4 is a transverse sectional view of the wheel, taken at 4—4 of Fig. 1, and Fig. 5 is a fragmentary sectional view, similar to that shown in Fig. 2, of a slightly modified form of construction of my vehicle wheel.

The vehicle or automobile wheel, indicated by 1 in the drawings, may be of any desired construction, such as the spoke or disc type, but is provided at its periphery with a felly 2, the cross-section of which is generally shaped as a wheel felly now in use. This felly is made of sheet metal, preferably formed in such a manner as to provide a peripheral channel $2^a$ and an outwardly extending flange $2^b$ at its inner edge, as shown best in Fig. 4, the channel $2^a$ being provided only to provide a more rigid cross-section of the felly.

The demountable tire rim, indicated by 3 in the drawings, may also be of any general type now in use for retaining a pneumatic tire thereon. The rim 3, as shown in the drawings, however, is provided at its inside and at its outer or forward edge with inwardly extending lugs 4, which extend toward the center of the wheel. Said lugs are tapered convergingly toward the center of curvature of the rim as well as inwardly from the outer side of the rim. The felly of the wheel is provided at its outer edge with inwardly extending tapered recesses $2^c$, equal in number to and shaped to receive the lugs 4 of the rim. The felly of the wheel is also provided with lugs 5, which extend inwardly toward the center of curvature of the felly and from the inner side thereof. These lugs are positioned forwardly of and immediately adjacent the forward edges of the recesses $2^c$ in the felly and are shaped to abut against the forward sides of the lugs 4 of the rim.

The inner ends of the lugs 5 are threaded for receiving the rim securing screws or bolts 6, the axes of said screws or bolts extending transversely of the longitudinal axis of the wheel and also transversely of the radii thereof. The ends of the screws 6 are tapered and extend into conformingly tapered holes $4^a$ at the inner ends of the lugs 4. The tapered ends of the screws 6 tend to force the lugs 4 of the rim inwardly into the recesses $2^c$ and lock the same therein, as well as to securely hold the screws 6 in position. However, spring washers 8 may be provided intermediate the lugs 5 and the heads of the screws or bolts 6, as shown in Figs. 1 and 2.

At the extreme inner ends of the lugs 5 are preferably provided oil holes $5^a$, which may be sealed at their outer ends by balls 9, as in the case of the spring operated ball check valves, said oil holes $5^a$ being provided to oil the threads of the screws 6 so that the same will not rust in position and will be permitted to be easily removed at all times.

The rim of the wheel is provided with another inwardly extending lug 10, which is provided with a hole extending radially relative to the center of curvature of the rim and through which the valve stem of the pneumatic tube of the tire is adapted to extend, the dust cap of the valve stem being indicated by 11, said dust cap being screwed against the inner end of the lug 10. The felly 2 of the wheel is provided with another recess extending inwardly from its outer edge, as indicated by 2<sup>d</sup> in Fig. 3, for receiving the lug 10 through which the valve stem extends.

There are preferably provided three or more of the securing lugs 4 and 5 on the rim and felly of the wheel, respectively. The lug 10 is positioned intermediate a pair of the other lugs, as shown best in Fig. 1. Said lug 10 prevents the rim from being secured to the felly except in one position.

In the modified form of construction shown in Fig. 5, the lug 12 shows the lugs 4 and 10 in the first structure as combined, serving as a securing lug against the lugs 5 and means through which the valve stem may extend and against which the dust cap 11 may be screwed, thus doing away with one of the lugs and one of the notches or recesses in the felly of the wheel.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a vehicle wheel of the class described, a wheel having recesses extending inwardly from its outer side, a tire rim having securing portions extending inwardly from its outer edge and adapted to be locked into said recesses, said wheel being provided with securing lugs adjacent one of the sides of said recesses adapted to be positioned adjacent the securing portions for driving said rim, and screws extending through said lugs into the securing portions of said rim, the inner ends of said screws being tapered and extended into tapered recesses in the securing portions of said rim.

2. In a vehicle wheel of the class described, a wheel having inwardly extending tapered recesses at the outer side of its felly, a tire rim having inwardly extending lugs of a shape corresponding with said recesses and adapted to extend therein, said wheel being provided adjacent one side of said recesses with lugs extending toward the center of the wheel, and screws extending through the last mentioned lugs into the lugs of said rim.

3. In a vehicle wheel of the class described, a wheel having inwardly extending tapered recesses at the outer side of its felly, a tire rim having inwardly extending lugs of a shape corresponding with said recesses and adapted to extend therein, said wheel being provided adjacent one side of said recesses with lugs extending toward the center of the wheel, and screws extending through the sides of said last mentioned lugs and provided at their ends with tapered portions adapted to extend into tapered recesses in the adjacent sides of said first mentioned lugs.

4. In a vehicle wheel of the class described, a wheel having cutout portions extending inwardly from its outer side, inwardly extending lugs adjacent to the one side of said cutout portions which extend transversely to the circumference of the wheel, and a tire rim having securing portions extending inwardly from its outer edge and adapted to be locked into said cutout portions, and to said lugs.

5. In a vehicle wheel of the class described, a wheel having cutout portions extending inwardly from its outer side, inwardly extending lugs adjacent to the one side of said cutout portions which extend transversely to the circumference of the wheel, a tire rim having securing portions extending inwardly from its outer edge and adapted to be locked into said cutout portions, and screw means extending transversely to the longitudinal axis and radius of said wheel, securing said rim to said lugs in said cutout portions.

6. In a vehicle wheel of the class described, a wheel having tapered cutout portions extending inwardly from the outer side of its felly, inwardly extending lugs adjacent to the one side of said cutout portions, and a tire rim having inwardly extending lugs of a shape corresponding with said cutout portions and adapted to extend therein, and be secured to said lugs.

7. In a vehicle wheel of the class described, a wheel having tapered cutout portions extending inwardly from the outer side of its felly, inwardly extending lugs adjacent to the one side of said cutout portions, a tire rim having inwardly extending lugs of a shape corresponding with said cutout portions and adapted to extend therein, and means for securing the lugs of said rim in said cutout portions of said wheel, and to said lugs.

In testimony whereof, I have hereunto set my hand at San Diego, California, this 29th day of June, 1926.

JESSE TILLUS KENNEDY.